United States Patent [19]

Abe

[11] Patent Number: 5,118,040

[45] Date of Patent: Jun. 2, 1992

[54] APPARATUS FOR WASHING THE WINDOW GLASS OF A VEHICLE

[76] Inventor: Tadashi Abe, 4-5 Fukuoka kuramoto aza kitsunemine sanban, Shiroishi-shi, Miyagi-ken, Japan

[21] Appl. No.: 616,631

[22] Filed: Nov. 21, 1990

[30] Foreign Application Priority Data

May 15, 1990 [JP] Japan .................................. 2-51343

[51] Int. Cl.$^5$ ............................................. B60S 1/48
[52] U.S. Cl. ................................. 239/284.1; 239/135; 15/250.05
[58] Field of Search ..................... 239/130, 135, 284.1, 239/284.2; 15/250.05

[56] References Cited

U.S. PATENT DOCUMENTS 4,905,904 3/1990 Ohara et al. ..................... 239/284.1

FOREIGN PATENT DOCUMENTS 2353738 5/1975 Fed. Rep. of Germany ... 239/284.2
2641221 3/1978 Fed. Rep. of Germany ... 15/250.05
1460494 11/1966 France ............................... 239/284.1
2419849 10/1979 France ............................... 239/284.1
0160760 6/1989 Japan ................................. 15/250.05
0309854 12/1989 Japan ................................. 15/250.05

Primary Examiner—Andres Kashnikow
Assistant Examiner—Karen B. Merritt
Attorney, Agent, or Firm—Knobbe, Martens, Olson & Bear

[57] ABSTRACT

An apparatus for washing the window glass of a vehicle comprising an intermediate container having an insulated construction and an electric heater which is connected to both a main tank for storing unheated washing fluid and an outlet from which the heated washing fluid is sprayed onto the glass. When the vehicle is turned on, the heater is turned on as well. Thus, with the vehicle in operation, the washing fluid is continually heated to a required temperature and held in the insulated intermediate container. As a result, it is possible to spray a required quantity of heated washing fluid at any time without excessive loading strain on the vehicle's battery and without excessive power consumption.

1 Claim, 2 Drawing Sheets

APPARATUS FOR WASHING THE WINDOW GLASS OF A VEHICLE

FIELD OF THE INVENTION

The present invention relates to apparatus for washing vehicle windows.

DESCRIPTION OF THE PRIOR ART

In cold areas, moisture formed on the windshield of vehicles such as automobiles can freeze into ice, obstructing vision. Additionally, oily film on the window glass may obstruct vision, especially at night. Obstructed vision makes driving dangerous.

Ice on the windshield hinders movement of the windshield wipers, reducing their efficiency in cleaning the windshield glass. Snowfall in the path of the wiper blades may hinder the operation of the wipers as well. Inoperable windshield wipers can lead to a diminished field of view and make driving dangerous.

To prevent these problems, heated window washing fluid has been employed. Typically, battery power or the remaining heat from warm engines has been used to heat the washing fluid. Battery powered heating can require a large amount of power over a very short time, creating too heavy a load on the battery. Using leftover heat from the vehicle's engine requires mechanisms that are often quite complicated in their design. Thus, it is difficult to supply a large quantity of heated washing fluid quickly.

SUMMARY OF THE INVENTION

The present invention provides an apparatus for washing the window glass of a vehicle wherein a main tank for storage of the washing liquid is connected by a conduit to an intermediate container for heating and storing the heated washing fluid. The intermediate container is, in turn, connected by a conduit to an outlet for spraying the heated washing liquid onto the glass. This arrangement makes it possible to spray, at a required time, a quantity of heated washing fluid which is great enough to wash the window glass yet does not drain the battery excessively.

DETAILED DESCRIPTION OF THE PREFERRED EMBODIMENT

Figure 1:
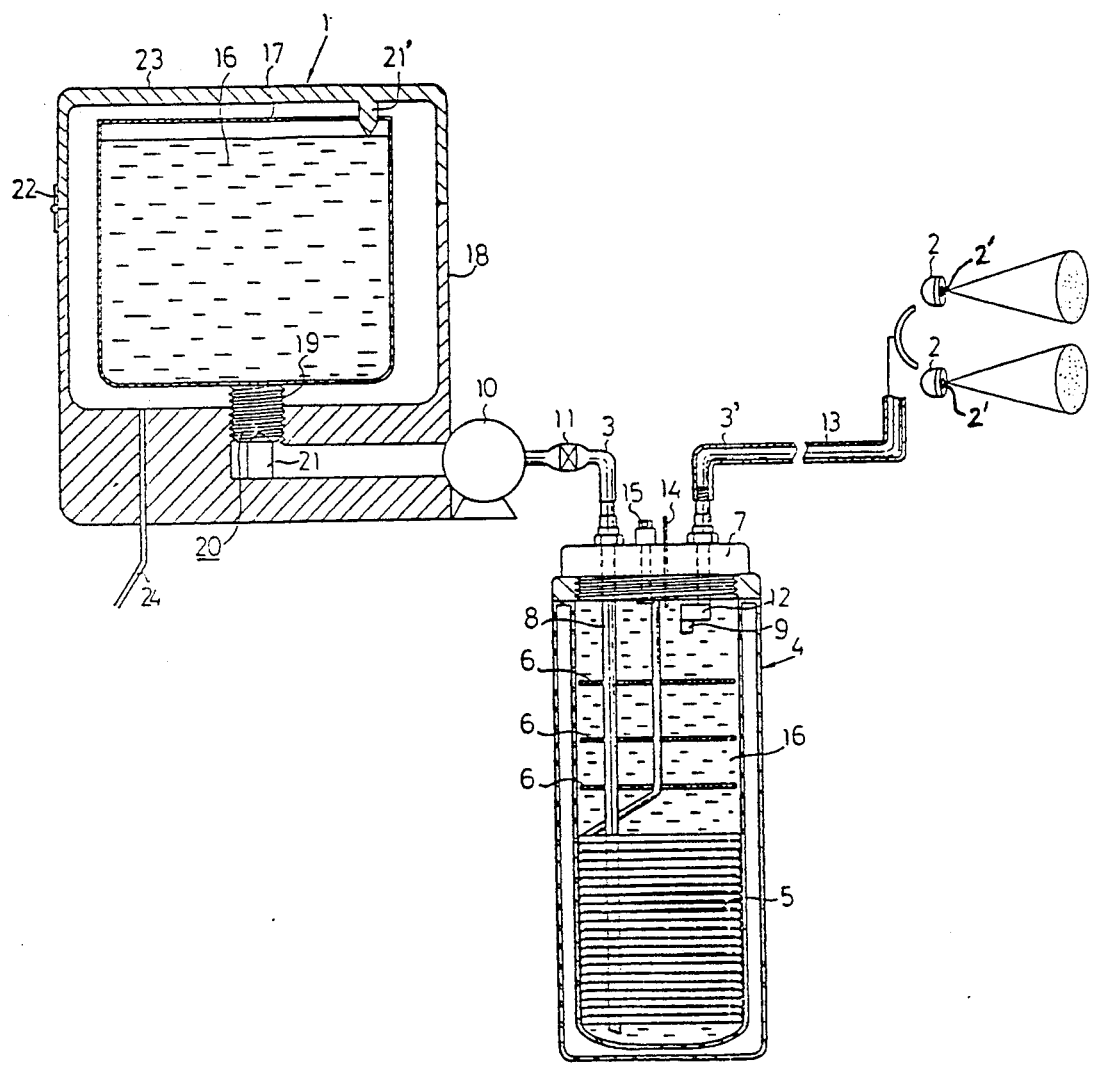
FIG. 1 is a cross sectional view of the present invention including a main tank, an intermediate container and heating apparatus, and an outlet for spraying heated washing liquid onto the window glass.

FIG. 1 shows a cross sectional view of the present invention for washing the window glass of a vehicle. There is a tank containing washing fluid 16 connected by a conduit 3 to an intermediate container 4 for heating the liquid 16. Container 4 also stores the heated liquid 16 until it is needed. Container 4 is in turn connected by a conduit 3' to an outlet 2 for spraying the washing fluid onto the window glass.

The main tank 1 holds washing fluid 16 in a 1000 ml polyethylene cartridge 17 with a round horizontal cross section. This is inserted into a holder 18. The holder 18 is connected to a cover 23 by a hinge 22 to allow easy access for replacement of the washing fluid cartridge 17. Extending through the bottom of the cover 18 is a drain pipe 24 for waste fluid 16. The cover 23 has a sharp protrusion 21' from its bottom surface which breaks through the top of the cartridge 17 to provide an air hole for ventilation. When the cartridge is initially inserted into the holder 18, a sealed discharge opening 19 protrudes from the bottom of the cartridge 17. This discharge opening 19 is threadedly inserted into an orifice 20 in the bottom of the holder 18. A sharp protrusion 21 extends from the bottom of the holder 18 into the threaded orifice 20. The tip punctures the sealed discharge opening 19, allowing the fluid 16 contained within the cartridge 17 to flow. Fluid flows from the cartridge 17 through a pump 10 and a check valve 11 before entering the conduit 3 leading to the intermediate container 4.

The intermediate container 4 is a 500 ml stainless steel cylinder constructed in vacuum bottle fashion. It is insulated by a cover 7 which seals the top of the container 4. A coiled electric heater 5, for heating the washing fluid 16 in the intermediate container 4, is incorporated in the lower portion of the container 4. The circuit of the electric heater 5 extends through the insulating cover 7 and is connected to a battery (not shown). A pipe 8 conducts washing fluid 16 from conduit 3, through the cover 7, to the bottom of the intermediate container 4. The pipe 8 thus feeds cold washing liquid 16 into the bottom of the intermediate container 4, near the heater 5. Another pipe 9 extends through the cover 7 a short distance into the top of the intermediate container 4 and discharges warmed washing fluid 16 via a conduit 3'. Conduit 3' then guides the heated liquid 16 to an outlet 2. Additionally, a temperature sensor 14 and a pressure valve 15 extend through the insulating cover 7 such that each can sense the washing liquid 16 inside the container 4 and yet can be set outside the container 4. Inside the intermediate container 4, three porous baffleplates 6 are arranged horizontally above the heater to prevent too rapid convection of the washing liquid 16.

The intermediate container 4 is continually replenished with washing liquid 16. There is a volume sensor 12 at the end of the outlet pipe 9 to determine whether or not the container 4 is full. The main tank 1 for cleaning liquid 16 is placed above the intermediate container 4 such that gravity insures that the intermediate container 4 remains full even without the action of the pump 10. This is important, for example, if heated liquid 16 evaporates during a long period when the pump 10 is not activated.

When the vehicle is started, the heater 5 is activated. The washing fluid 16 in the intermediate container is heated to 70 degrees Celsius. The temperature is controlled by the temperature sensor 14. The injection and mixing of fluid from the unheated main tank 1 with heated fluid in intermediate container 4 slightly reduces the temperature of the fluid in the intermediate container 4. Subsequently, the temperature sensor 14 activates the heater 5 to warm the cooled mixture to 70 degrees Celsius. When the temperature sensor 14 registers 70 degrees Celsius, the heater 5 is automatically turned off. For automobiles, a 12 volt/40 amp battery is typically used, putting out 40 amps of direct current to heat the washing fluid 16 in the intermediate container 4. The heated washing fluid is then held in the intermediate container 4 for latter use. Thus, the intermediate container 4 has a ready supply of heated washing fluid 16.

When heated washing fluid is called for, the pump 10 is activated, pumping liquid 16 from the main tank 1 into the bottom of the intermediate container 4, forcing overflow washing fluid 16 from the top of the intermediate container 4 to leave the intermediate container 4 through outlet pipe 9. The washing fluid 16 is conveyed through conduit 3' to the outlet 2, where it is sprayed, under pressure from the fluid behind it, onto the window glass. The conduit 3' between the intermediate container and the outlet 2 is covered with insulating material 13 to insure that the heated washing fluid remains warm as it travels to the outlet 2.

Figure 2A:
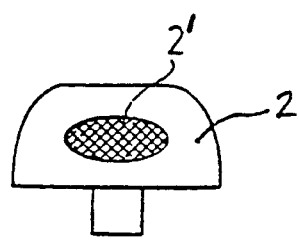
FIG. 2a is a front view of the outlet for spraying heated washing fluid.
Figure 2B:
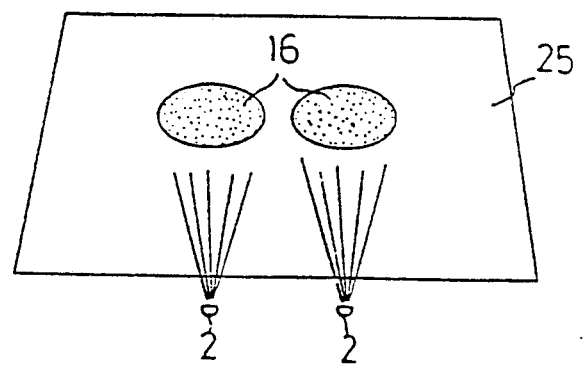
FIG. 2b is a perspective view of the washing fluid being sprayed onto the window glass.

FIG. 2a shows a front view of the outlet 2 for the washing fluid. There is an elliptical ejection hole 2' arranged horizontally. FIG. 2b shows a perspective view of a set of outlets 2 in operation. Each outlet sprays cleaning fluid 16 toward the glass 25 from its ejection hole 2'. The glass 25 is located such that the spray reaches the glass in the form of an expanded ellipse 16 parallel to the outlet ellipse 2'. For example, the spray on the window glass from a typical size window washing liquid outlet 2' on an automobile will cover an area 300 mm wide and 200 mm high.

The above description of the invention is for automobiles of compact or typical passenger size. For larger vehicles, such as trucks or busses, the capacity of the intermediate container may be increased to 2000 ml and a 24 volt/60 amp battery may be used to heat the washing fluid. Additionally, the main tank 1 can be of any sort, not necessarily employing a cartridge.

The heating apparatus only operates when it is switched on. Thus, the washing fluid may be sprayed in the same manner without being heated. However, with the heater in operation, the perpetually filled intermediate container 4 insures that heated washing fluid is instantly ready for use. There is no need for a great surge of power to instantaneously heat cold fluid since a store of heated washing fluid is perpetually replenished in the intermediate container 4. Thus, excessive loading of the battery is avoided. Additionally, the insulating covering 13 of the conduit 3' from the intermediate tank 4 to the outlet 2 insures that no radiation of heat occurs during transport of the washing fluid through the conduit 3'.

Heated washing fluid sprayed over a wide area of the window glass not only cleans the glass, it melts ice and snow allowing easier movement of the windshield wipers in the case of freezing weather. This, in turn, allows the washing apparatus to perform more effectively.

What is claimed is:

1. An apparatus for washing window glass of a vehicle, comprising a main tank for washing fluid, an outlet in a lower portion of said tank, an insulated container having a cover on an upper end, said container with said cover being positioned relative to said tank such that said cover is physically lower than the tank outlet, a first conduit extending from said tank outlet and through said container cover to a lower portion of said container, an electrical heating element within the lower portion of said container, a spray nozzle adjacent said window glass, an insulated second conduit extending from the upper end of the container to said spray nozzle for conducting heated fluid from the upper end of the container to said spray nozzle, and a pump in said first conduit for pumping fluid from said container to said spray nozzle, whereby the position of said container relative to said tank enables fluid to drain by gravity from the tank into the container to insure that the container remains full of fluid.

* * * * *